United States Patent [19]

Fujii et al.

[11] Patent Number: 6,139,963
[45] Date of Patent: **\*Oct. 31, 2000**

[54] POLYVINYL ALCOHOL HYDROGEL AND PROCESS FOR PRODUCING THE SAME

[75] Inventors: Hiroaki Fujii; Masanobu Abe, both of Okayama; Keiko Oka, Kurashiki, all of Japan

[73] Assignee: Kuraray Co., Ltd., Kurashiki, Japan

[ \* ] Notice: This patent issued on a continued prosecution application filed under 37 CFR 1.53(d), and is subject to the twenty year patent term provisions of 35 U.S.C. 154(a)(2).

[21] Appl. No.: 08/974,915

[22] Filed: Nov. 20, 1997

[30] Foreign Application Priority Data

Nov. 28, 1996 [JP] Japan .................................. 8-317522
Nov. 28, 1996 [JP] Japan .................................. 8-317523
Jan. 24, 1997 [JP] Japan .................................. 9-011057

[51] Int. Cl.$^7$ ........................................................... B32B 15/02
[52] U.S. Cl. .......................... 428/407; 523/210; 523/223; 524/503
[58] Field of Search ................................... 523/204, 209, 523/210, 223; 524/503; 428/407

[56] References Cited

U.S. PATENT DOCUMENTS 5,840,423  11/1998  Sano et al. ............................... 438/364

FOREIGN PATENT DOCUMENTS 63-17904    1/1988   Japan .
63-276488  11/1988   Japan .
7-41516     2/1995   Japan .
251190     10/1995   Japan .
7-251190   10/1995   Japan .

OTHER PUBLICATIONS

Derwent Abstracts, JP 9 124 731, May 13, 1997.

Derwent Abstracts, JP 7 247 365, Sep. 26, 1995.

*Primary Examiner*—James J. Seidleck
*Assistant Examiner*—U. K. Rajguru
*Attorney, Agent, or Firm*—Oblon, Spivak, McClelland, Maier & Neustadt, P.C.

[57] ABSTRACT

A polyvinyl alcohol hydrogel has a surface layer comprising a net-like structure formed by entanglement of fiber-like articles having a diameter of 0.1 to 50 μm. This gel has a large surface area and high capability of adhering microorganisms and permeating liquid, thereby exhibiting excellent purifying function. Processes for producing the above hydrogel are also provided.

12 Claims, 3 Drawing Sheets

POLYVINYL ALCOHOL HYDROGEL AND PROCESS FOR PRODUCING THE SAME

BACKGROUND OF THE INVENTION

1. Field of the Invention

The present invention relates to a hydrogel suitable as a carrier for microorganism for waste water treatment, a bioreactor and the like and, also, to a process for producing the same.

2. Description of the Prior Art

Polymer gels have been vigorously studied as carriers for biocatalysts, water-retaining agents, cooling agents, replacements for biogels such as eye, skin and joints, controlled release material for medicines and base material for actuator.

Known polymer hydrogels comprise agar, alginates, carrageenan, polyacrylamide, polyvinyl alcohol (hereinafter referred to as "PVA") and photo-curing resins. Among these, PVA-based gels, having high mechanical strength and excellent hydrophilic properties (water-containing capability, inhabitability for microorganisms and the like), have been actively studied and, in particular, have attracted attention as carriers for microorganisms.

It is necessary that hydrogels used as carriers for microorganisms and bioreactors have high retaining capability for microorganisms and water and high capability for trapping microorganisms and other fine matter. Further improvement of these capabilities have been studied from various angles.

For example, Japanese Patent Application Laid-open No. 41516/1995 discloses a PVA gel obtained by contacting an aqueous solution containing PVA and sodium alginate with an aqueous calcium chloride solution or the like to solidify the sodium alginate present at least on the surface of the PVA solution to shape the mixture and then gelling the shaped matter by repeated cycles of freezing and thawing or by contacting with a coagulating liquid for PVA. However, the gel obtained by contacting with the coagulating liquid for PVA has low capability for trapping microorganisms (see FIG. 4), because of its smooth surface. The gel obtained by repeated cycles of freezing and thawing has on its surface projections and recesses, which however do not penetrate into the inside of the gel, but also has a dense layer near the surface, so that microorganisms cannot get into the inside and can live only on the surface of the gel (see FIG. 5).

Figure 4:
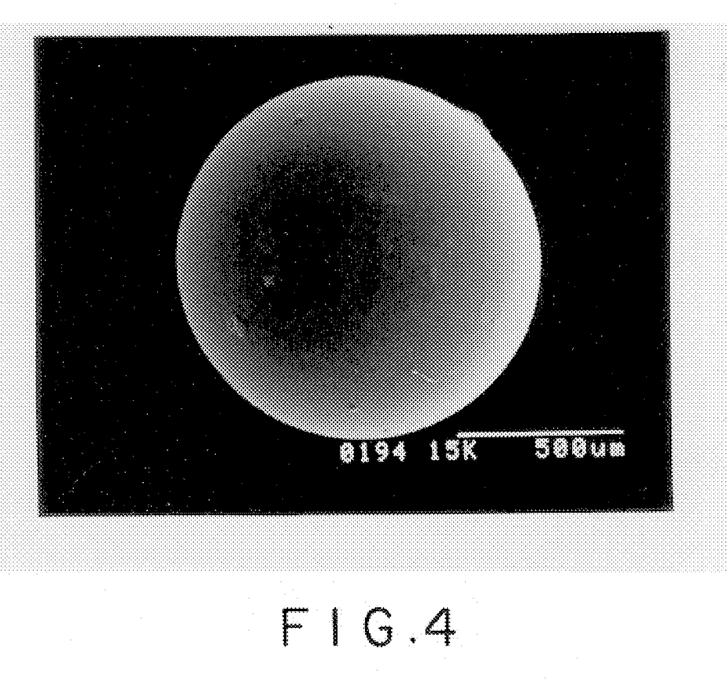
FIG. 4 is a scanning electron microphotograph showing the surface structure of the PVA hydrogel having a smooth surface obtained in Comparative Example 1 (magnification: 60)
Figure 5:
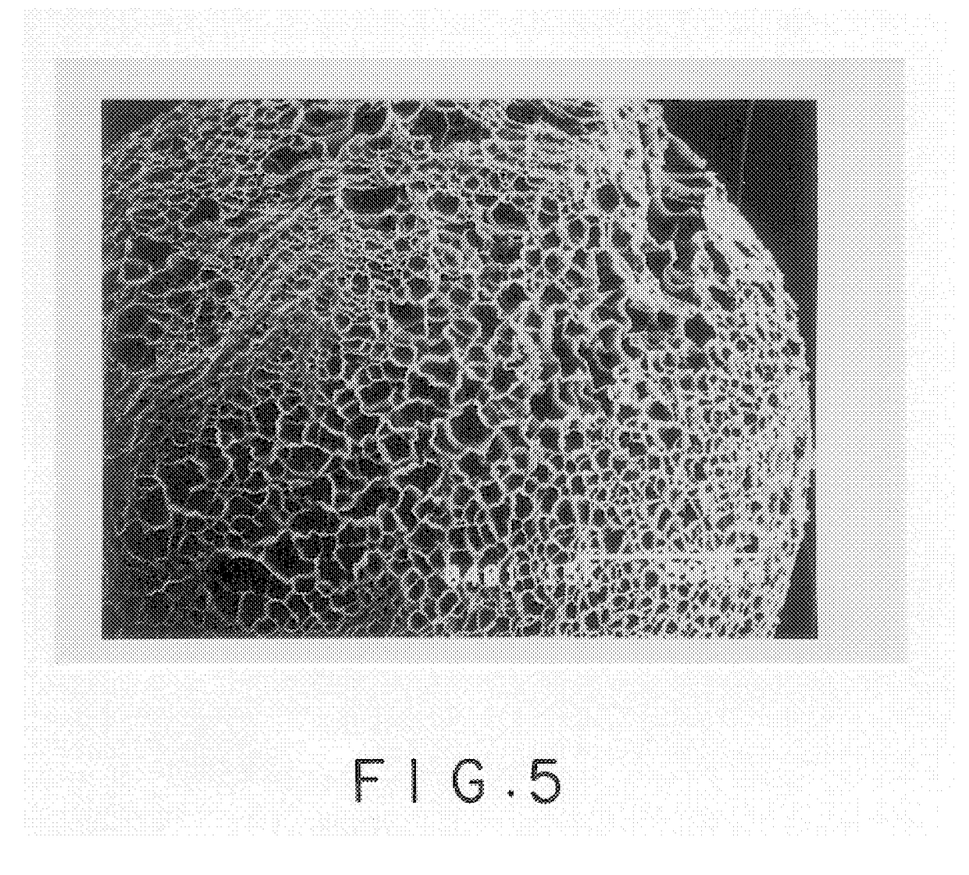
FIG. 5 is a scanning electron microphotograph showing the surface structure of the PVA hydrogel obtained in Comparative Example 2 and having a roughened surface where crater-like projections and recesses have been formed (magnification: 60).

Japanese Patent Application Laid-open No. 17904/1988 discloses a huge granular porous PVA obtained by dispersing a mixed aqueous solution of PVA and a spontaneous gelation accelerating agent such as sodium chloride in an organic solvent such as toluene, to form spherical granules, and then allowing them to gel by themselves. By this process, the PVA precipitates from the aqueous mixed solution and causes phase separation, so that the precipitates have heterogeneous structure and hence give huge porous PVA granules. However, this process can only produce a gel having a smooth surface, like one obtained by contact with a PVA coagulating liquid (FIG. 4).

Japanese Patent Application Laid-open No.276488/1988 discloses a process which comprises adding sodium hydrogencarbonate or the like to an aqueous PVA solution to generate fine bubbles and then subjecting the mixture to freezing and thawing treatment, to effect gelation. The obtained gel, however, has a smooth surface and hence has low capability for trapping microorganisms. Furthermore, the gel has large pores (size: at least 100 $\mu$m) formed from bubbles, so that microorganisms, having easily invaded into the inside, cannot be retained over a long period of time.

Japanese Patent Application Laid-open No. 251190/1995 discloses a gel having a structure where short fibers are planted on the surface like mustache. The gel is obtained by adding dropwise a mixed solution of PVA and sodium alginate to an aqueous calcium chloride solution having dispersed short fibers. However, adhering short fibers by such a process results in deterioration in gel properties. Furthermore, presence of mustache-like fibers tends to make the gel granules entangle with each other, so that the granules are readily damaged. In addition, no net-like structure with a multiplicity of fibers can be formed on the surface, which leads to insufficient improvement in capability for trapping microorganisms.

SUMMARY OF THE INVENTION

Accordingly, an object of the present invention is to provide a PVA gel having excellent properties, including capability for trapping microorganisms and inhabitability for microorganisms.

Another object of the present invention is to provide an efficient process for producing the PVA gel.

The present invention provides:

1) A polyvinyl alcohol hydrogel having a surface layer comprising a net-like structure formed by entanglement of fiber-like articles having a diameter of 0.1 to 50 $\mu$m;
2) The polyvinyl alcohol hydrogel according to (1), further having a spherical shape having a diameter of 1 to 10 mm;
3) The polyvinyl alcohol hydrogel according to either (1) or (2), further being acetalized;
4) A bioreactor comprising the polyvinyl alcohol hydrogel according to any one of (1) through (3);
5) A purifying apparatus using the polyvinyl alcohol hydrogel according to any one of (1) through (3);
6) A shaped polyvinyl alcohol article obtained by removing at least part of water contained in the polyvinyl alcohol hydrogel according to any one of (1) through (3);
7) A gel having the feature of forming by alkali treatment a polyvinyl alcohol hydrogel having a surface layer comprising a net-like structure, said net-like structure being formed by entanglement of fiber-like articles having a diameter of 0.1 to 50 $\mu$m;
8) A process for producing polyvinyl alcohol hydrogels, which comprises the steps of:
   adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid,
   contacting said phase-separated liquid with a cation-containing liquid, to solidify the polymer B present at least on the surface of said phase-separated liquid; and
   contacting the obtained solid with a coagulating liquid having coagulating function for said polymer A, to effect gelation;
9) A process for producing polyvinyl alcohol hydrogels, which comprises the steps of:
   adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and removing from the obtained gel said polymer B partially or entirely;

10) A process for producing polyvinyl alcohol hydrogels, which comprises the steps of:

adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and effecting acetalization simultaneously with or after the above gelation;

11) A process for producing polyvinyl alcohol hydrogels, which comprises the steps of:

adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; effecting acetalization simultaneously with or after the above gelation; and removing from the gel obtained in the above step said polymer B partially or entirely;

12) The process according to any one of 8) through 11), wherein said polymer (polymer B) which gels on contact with a cation is sodium alginate.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
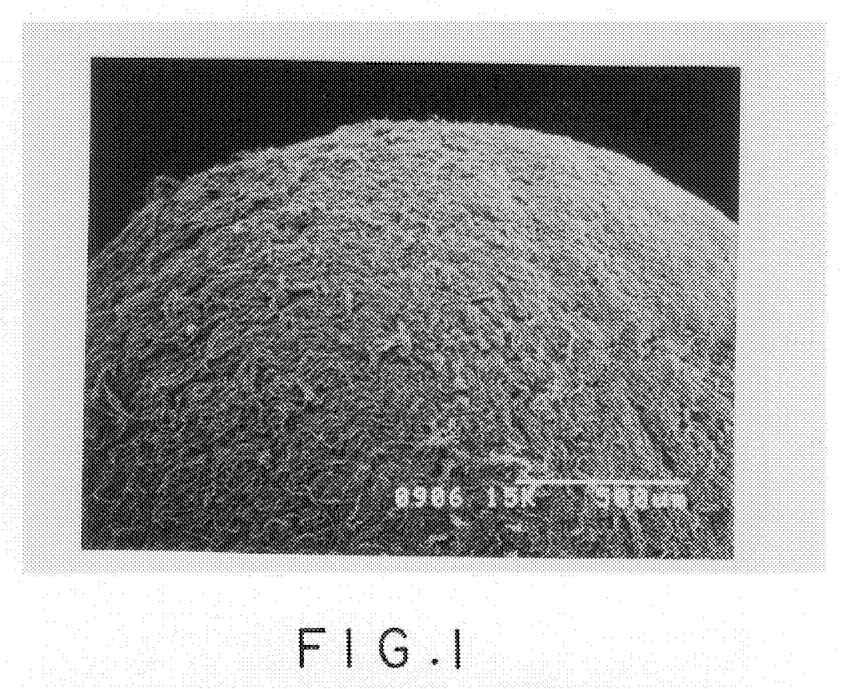
FIG. 1 is a scanning electron microphotograph showing an example of the surface structure of the PVA hydrogels according to the present invention (magnification: 60)
Figure 2:
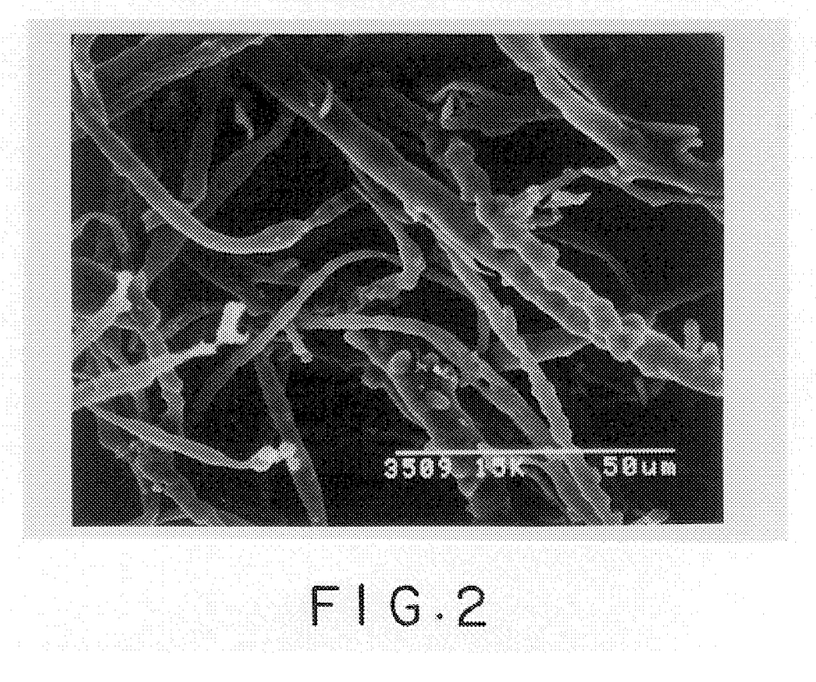
FIG. 2 is a scanning electron microphotograph showing the shape of fiber-like articles forming the surface layer of a PVA hydrogel according to the present invention (magnification: 1000)

The present invention has been completed based on the finding that a PVA gel having a surface layer comprising a net-like structure formed by entanglement of fiber-like articles having a diameter of 0.1 to 50 μm (see FIGS. 1 through 3) is excellent in various performances. When this gel is used, for example, as a sewage purifying material, the net-like structure, which forms a roughened surface, increases the capability for trapping microorganisms and the like and provides good inhabitability for microorganisms. The sewage purifying capability is further enhanced because the gel, with its inside having nothing that prevents liquid to pass therethrough, can permit liquid to pass through its inside easily.

For the same reason, the gel produces also excellent effect as a filter, as well as a packing material for chromatography thanks to its markedly large effective surface area. The net-like structure of the surface layer is very loose, which leads to high water-retaining property, so that the gel has excellent effects as coolant and water-retainer.

It is necessary that the fiber-like articles forming the net-like structure each have a diameter ranging from 0.1 to 50 μm, preferably from 0.2 to 20 μm, more preferably from 0.3 to 10 μm, in view of capability for trapping microorganisms, increase in surface area, liquid permeability and water-retaining property. The surface layer may comprise, within limits not to impair the effect of the present invention, other fiber-like articles and materials than as specified in the present invention.

The fiber-like articles need not have the same shape, but they may differ in thickness and length. Likewise, any single one of the fiber-like articles may longitudinally be of different thickness, shape or the like.

Various favorable effects can be produced by the surface layer comprising a net-like structure formed by entanglement of such fiber-like articles.

The surface of the gel of the present invention is not necessarily covered wholly with the fiber-like articles. It is, however, desirable that at least 30%, preferably at least 50%, more preferably at least 80% of the gel surface be constituted of a net-like structure (surface layer) comprising the fiber-like articles.

This surface layer desirably has a thickness of 0.1 to 20%, more preferably about 1 to 10% of the diameter (maximum diameter) of the gel, in view of capability for trapping microorganisms and the strength and wear resistance of the gel.

It is also desirable that the inner part of the gel of the present invention be constituted of a sponge-like structure finer than that of the surface layer. When this gel is used as a carrier for biocatalyst, presence of the fiber-like articles as the surface layer helps to trap microorganisms easily and the microorganisms can then live in a good condition where the fibers are present. In this case, the inner part comprising a finer structure can improve the inhabitability for microorganisms and increases the gel strength, which are both preferred. In view of the gel strength, the inner part preferably comprises a inter-connected sponge-like structure having a multiplicity of micropores, and is not constituted of fiber-like articles.

The micropores of the sponge-like structure of the inner part preferably have a diameter ranging from 0.1 to 100 μm, more preferably from 0.5 to 50 μm, most preferably from about 1 to 10 μm.

It is desirable that the dense inner part have a thickness of at least 10%, more preferably at least 40%, in particular at least 50% of the gel diameter (maximum diameter) and not more than 99.9%, more preferably not more than 99% thereof, in view of the strength and wear resistance of the gel.

The inner part of the gel need not have a uniform structure. Thus, the inner part may have diverse structures part by part and, further, be connected to the surface layer via an intermediate layer having a different structure. In the latter case, the intermediate layer desirably has such a structure that will not constitute a barrier between the surface layer and inner part, so that microorganisms can get into the inner part. In view of liquid permeability, the porosity of the intermediate layer is desirably larger than that of the inner part (microporous layer). Then, when the gel is used as a carrier for biocatalyst, anaerobic bacteria live in the inner part of the gel and aerobic bacteria in the intermediate and surface layers, so that better purifying effect can be produced.

Figure 3:
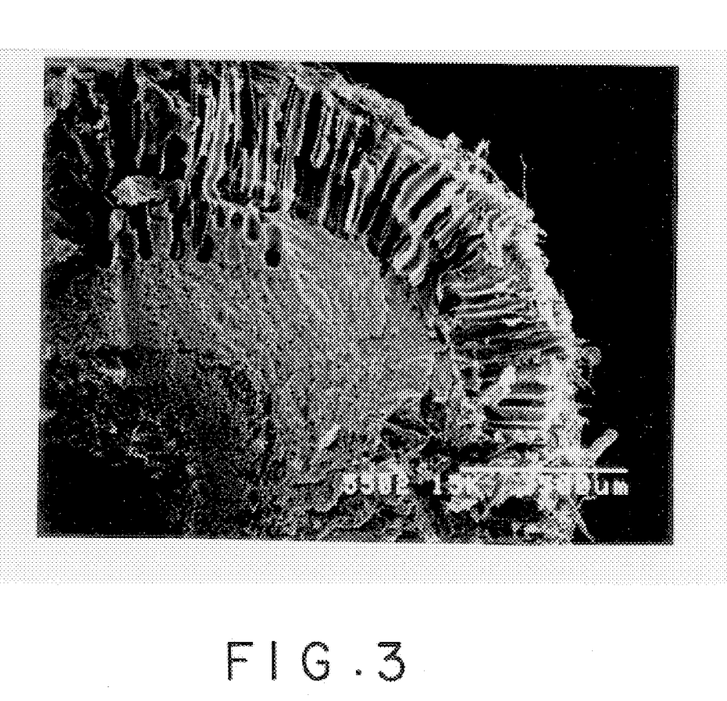
FIG. 3 is a scanning electron microphotograph showing an example of the cross-section (internal structure) of the PVA hydrogels according to the present invention (magnification: 60)

It is particularly desirable that the gel be provided with an intermediate layer comprising a multiplicity of finger-like voids separated from each other by thin walls extending from the inner part toward the surface layer, as seen in FIG. 3. This construction produces marked effects with respect to invasion of microorganisms into the inside and liquid permeability. The voids desirably have a diameter of about 10 to 200 μm.

The thickness of the intermediate layer is not specifically limited and may be, for example, about 1 to 50% of the gel diameter (maximum diameter). Where an intermediate layer has larger pores than those of the dense inner layer, too large a thickness of the intermediate layer will decrease the gel strength. It is therefore recommended to adjust the thickness of the intermediate layer according to the intended purpose and use of the gel.

The gel of the present invention may have any desired shape, such as spherical, oval, cubic, film-like, cylindrical, hollow cylindrical, square pillar-like, rod-like or random-shaped. For use as a carrier for bioreactor or the like, the gel is desirably spherical in view of durability, packing effect, flowability in a sewage treating tank and handleability. In this case, the diameter (maximum diameter) of the spherical gel is desirably 1 to 10 mm, more preferably 3 to 5 mm, in view of separability of the prepared carrier from sludge and activity of microorganisms.

The gel of the present invention preferably has a water content on wet base of at least 50% by weight, more preferably at least 60% by weight, most preferably at least 90% by weight. When used for sewage treatment, the gel desirably has a water content as high as possible as long as it has a sufficient strength. In view of gel strength, the water content is preferably set at not more than 98% by weight.

The water content herein is determined as follows. A hydrogel sample is immersed in water at 25° C. for 24 hours. After water attaching to the surface has been removed, the wet weight (W1) of the gel is measured. Then, after being dried at 105° C. for 4 hours, the gel is measured for dry weight (W2). The water content is calculated from the wet weight (W1) and dry weight (W2) with the following equation:

$$\text{Water content (\%)} = (W1-W2)/W1 \times 100$$

Although there is no particular limitation to processes for producing the PVA gel having a surface layer comprising fiber-like articles, it is recommended to employ the following process, which can produce the gel efficiently. That is, the process comprises the steps of:

adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid; and contacting the obtained solid with a coagulating liquid having coagulating function for said polymer A, to effect gelation; or adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and removing from the obtained gel said polymer B partially or entirely; or adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and effecting acetalization simultaneously with or after the above gelation; or adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation;

effecting acetalization simultaneously with or after the above gelation; and removing from the gel obtained in the above step said polymer B partially or entirely;

Any type of polyvinyl alcohol can be used as the polymer A with no particular limitation. It is, however, desirable to use a PVA having an average degree of polymerization of at least 1,000, preferably at least 1,500, in view of the strength and water resistance of the resulting gel, and not more than 20,000, preferably not more than 10,000 from the viewpoint of easy operation and cost. The degree of saponification is desirably at least 95 mole %, more preferably at least 98 mole %, most preferably at least 99.8 mole %, in view of water resistance. In the present invention, unmodified PVAs can be used with no problems, but various modified PVAs may also be used as long as such modifications do not impair the effect of the present invention.

Preferred examples of the polymer B that gels on contact with a cation, preferably a multi-valent metal ion, are water-soluble synthetic polymers, e.g. polyethylene glycol and its derivatives and water-soluble polyurethanes, and water-soluble polysaccharides, e.g. alginic acid and its salts, carrageenan, mannan and chitosan. These polymers may be used in combination, within limits not to impair the effects of the present invention.

Among these, water-soluble polysaccharides, most of which mostly gel on contact with cation and have good gel-forming property, are suitably used. Also usable are PVAs modified with a functional group coagulatable on contact with cation, e.g. itaconic acid-modified PVA and maleic acid-modified PVA.

Alkali metal salts of alginic acid, in particular sodium alginate, may be preferably used in view of gel formability and net-like structure-forming capability.

A high PVA concentration in the mixed polymer solution used leads to high strength of the resulting gel, but to poor inhabitability for microorganisms. It is therefore desirable to set the PVA concentration at 1 to 40% by weight, more preferably at 3 to 20% by weight. The concentration of polymer B is desirably in a range of 0.2 to 4% by weight, preferably 0.5 to 2% by weight, from the viewpoint of gel-forming capability.

The mixing ratio by weight between polymer A and polymer B is desirably in a range of 100:0.2 to 30, particularly in a range of 100:1 to 20, and the total polymer concentration is desirably in a range of 1 to 50% by weight, both in view of gel-formability, capability for forming net-like structure and gel strength.

With respect to the solvent to be used, water is generally used, in view of easy production of gel. Other solvents may, however, be also used in combination with water. Examples of other solvents are alcohols such as ethylene glycol, glycerine and polyethylene glycol, dimethyl sulfoxide, dimethylformamide and diethylenetriamine. One or at least two of these solvents may be used in combination with water. Aqueous thiocyanate solutions are also usable.

Upon use of a solvent principally containing water, it is desirable to use as polymer B a water-soluble polymer, in particular a water-soluble polysaccharide.

The temperature of the solution prepared is desirably in a range of about 10 to 100° C., particularly about 20 to 80° C., in view of thermal stability of the polymers used and solution viscosity.

In the present invention, although it is desirable to use a mixed solution containing polymer A and polymer B, polymers other than these two and, further, other additives may as necessary be added. Examples of usable other additives are culture media for microorganisms, reinforcing materials to increase the gel strength and fillers for adjusting the specific gravity.

It is essential, in order to form a surface layer comprising fiber-like articles, to cause the mixed polymer solution containing polymer A and polymer B to undergo phase separation. For this purpose, a substance (substance C) capable of phase separating these polymers is added to the mixed polymer solution containing polymer A and polymer B, to prepare a phase-separated liquid.

Salts are desirably used as the substance C, although there are no specific restrictions with respect to selection of substance C. Among various salts, those containing at least divalent anion are preferred in view of gel-forming capability and little influence on acetalization. In this case, as the polymer B that gels on contact with multivalent metal ion, it is desirable to use a polymer that precipitates by salting-out effect, in particular sodium alginate, in view of gel formability and capability for forming phase-separated liquid.

Examples of usable salts are carbonates, e.g. sodium carbonate, potassium carbonate, calcium carbonate, ammonium carbonate and magnesium carbonate; hydrogencarbonates, e.g. sodium hydrogencarbonate, potassium hydrogencarbonate, ammonium hydrogencarbonate, calcium hydrogencarbonate and magnesium hydrogencarbonate; sulfates, e.g. sodium sulfate, potassium sulfate, ammonium sulfate and magnesium sulfate; phosphates, e.g. sodium phosphate, potassium phosphate, ammonium phosphate and magnesium phosphate; and halides, e.g. sodium chloride and potassium chloride. These salts may also be used in combination. Hydrogencarbonates and sulfates are particularly preferred in view of solubility, cost and the fact that they remain only little after gel formation process.

Where sodium alginate is used as polymer B, it is desirable to use sodium hydrogencarbonate and/or sodium sulfate as substance C.

It is recommended to add the substance capable of phase separating the polymers in an amount of about 0.01 to 1% by weight based on the weight of the mixed polymer solution.

The term "phase separation" herein means a phenomenon that a homogeneous solution containing at least polymer A and polymer B separates, on addition of substance C, into a plurality of solutions each having a specific composition. The resulting heterogeneous mixed liquid is called "phase-separated liquid".

Occurrence of phase separation can be checked by the following test. That is, substance C is added to a mixed polymer solution containing at least polymer A and polymer B and the mixture is sufficiently stirred. Then, the mixture is tested for light absorbancy by absorptiometry (660 nm). The obtained data are plotted against the amount of substance C added. A rapid increase in the increasing rate of absorbancy shows that phase separation has occurred at that point.

The phase separation can also be checked by allowing the mixture to stand at 60° C. for 1 to 7 days and visually observing separation of the mixture into 2 or more layers.

Although it is desirable, in view of easy operation, to add substance C to a mixed aqueous solution of polymer A and polymer B, the order of addition sequence can be changed, naturally.

The condition of the net-like structure of gel (diameter and density of fiber-like articles, and thickness of surface layer) can be controlled by adjusting the degree of phase separation, the mixing ratio and viscosity ratio of the polymers used, mixing conditions, the temperature of the mixed solution, the type and amount of substance C, the coagulating temperature and like conditions.

For instance, increasing the amount of substance C or elevating the temperature of the mixed polymer solution of polymer A and polymer B increases the thickness ratios of the surface layer and the intermediate layer. Inversely, decreasing the amount of substance C or lowering the temperature of the mixed polymer solution of polymer A and polymer B increases the content of the inner layer (microporous layer).

The phase-separated liquid comprising polymer A and polymer B is constituted of, where for example polymer A is a PVA (degree of polymerization: 1,700; degree of saponification: 99.8 mole %) and polymer B is sodium alginate, a mixed layer containing polymer A and polymer B and a substantially single layer containing polymer A or polymer B alone. In this case, permitting the specific gravities of the separated layers to become close together or like means causes fine dispersion, thereby, estimatedly, decreasing the diameter of fiber-like articles constituting the surface layer.

The phase-separated liquid thus obtained is then contacted with a solution containing a cation, preferably one containing a multi-valent metal ion. Aqueous solutions containing a cation are generally used for this purpose. On this occasion, it is desirable to at first mix the phase-separated liquid sufficiently to obtain a homogeneous dispersion and then contacting the cation-containing solution to the dispersion. This process ensures that the obtained gel has a uniform structure.

Examples of cations usable for this purpose are alkali earth metal ions, e.g. calcium ion, magnesium ion, strontium ion and barium ion; multi-valent metal ions, e.g. aluminum ion, nickel ion and cerium ion; potassium ion and ammonium ion. These cations may also be used in combination of 2 or more. With respect to the solvent tobe used, water is generally used in view of easy production of gel. Calcium chloride is preferred in view of cost, handleability and capability of forming gel. In this case, combined use of sodium alginate is preferred, since it produces excellent effect of forming gel and that the produced gel has a surface formed by a fine net-like structure.

The concentration of the cation-containing solution is preferably in a range of 0.05 to 1 mole/l, more preferably in a range of about 0.1 to 0.5 mole/l, in view of capability of forming gel.

The contact of a phase-separated liquid with a cation-containing solution causes polymer B present at least on the surface of the phase-separated liquid to solidify, to shape the mixture. When spherical gel granules are desired, this shape can readily be obtained by action of surface tension, by adding dropwise or spraying the phase-separated liquid to the cation-containing solution. On this occasion, it is desirable to conduct the addition with an extrusion nozzle. The diameter of the extrusion nozzle may be suitably selected and is generally about 1 to 10 mm. Desired shapes can also be obtained by injecting the mixture into a mold or by cutting or processing the obtained gels.

The solid is separated and then contacted with a coagulating liquid, which effects gelation into the inside, to yield the desired gel. Polymer B present on at least the surface of the phase-separated liquid has been solidified in the previous step. The contact with a coagulating liquid causes polymer A to gel also, thereby producing a gel comprising polymer A and polymer B. Preferably, removal of part of or entire polymer B contained in this gel leads to production of the gel of the present invention.

Polymer B can be removed by any process with no specific limitation, insofar as the process employed does not remove polymer A. For instance, polymer B is removed by treating with an aqueous solution containing an alkali metal salt or by allowing the gel to stand for a long period of time, which causes microbial decomposition. For instance, immersion in an aqueous sodium hydroxide solution (1 mole/l, 30° C.) for 24 hours can remove polymer B almost completely. The term "alkali treatment" used in Claim 7 of the present means this type of treatment with aqueous sodium hydroxide solution.

On the removal of polymer B, a surface layer comprising a net-like structure formed by entanglement of fiber-like articles is formed and, at the same time, pores are formed inside the gel, to increase the surface area. These formations produce excellent effects for capability for adhering microorganisms, inhabitability for microorganisms and liquid permeability. In order to produce these effects sufficiently, it is desirably to remove at least 50% by weight, preferably at least 80% by weight of polymer B. However, the gel may be subjected to use without substantial removal of polymer B. Then, although polymer B remains partially or wholly at an early stage of use, it will be gradually removed over time by action of microorganisms or alkali. The step for removing polymer B is therefore set according to the intended use of the gel.

The mechanism involved in production of this gel with the surface layer having such a special structure is not quite clear, but estimated as follows. In the phase-separated liquid of polymer A and polymer B, polymer B forms a dispersing phase (sea component) and polymer A a dispersed phase (islands component). When the phase-separated liquid is contacted with a cation-containing solution, among the polymer B molecules forming the dispersing phase those present at least on or near the surface solidify. Then, on contact with a coagulating liquid, the polymer A forming the islands phase coagulates. After removal of polymer B, fiber-like articles therefore form.

Examples of suitable coagulating liquids capable of coagulating vinyl alcohol polymers are liquids containing at least one compound selected from the group consisting of sodium sulfate, ammonium sulfate, potassium sulfate, magnesium sulfate, aluminum sulfate, sodium citrate, ammonium citrate, potassium citrate, magnesium citrate, aluminum citrate, sodium tartarate, ammonium tartarate, potassium tartarate, magnesium tartarate and aluminum tartarate. Among these, an aqueous sodium sulfate solution, which has high coagulating power, is preferred. In this case, the concentration is desirably at least 50 g/l, more preferably at least 100 g/l and use of saturated sodium sulfate solution is most preferred.

Other treatments such as crosslinking treatment may be conducted in any step during the manufacture, in order to improve the water resistance of the PVA gel. In particular, acetalization is preferred, since it is easy to conduct and improves the water resistance to a large extent. The acetalization may be conducted in any step, but preferably simultaneously with coagulation (gelation) treatment with a coagulating liquid and/or after the gelation, in particular simultaneously with coagulation, from the viewpoint of easy operation.

The acetalization is desirably conducted with an aqueous solution containing an aldehyde and an acid. From the viewpoint of operation easiness, it is recommended to incorporate an aldehyde into the coagulating liquid used and effect acetalization simultaneously with coagulation (gelation). This method effectively prevents, thanks to the presence of the coagulating liquid, the hydrogel from swelling or dissolving in the presence of the aldehyde or the acid, thereby producing better effects.

Examples of aldehydes usable for this purpose are glyoxal, formaldehyde, benzaldehyde, succinaldehyde, malondialdehyde, glutaraldehyde, adipinaldehyde, terephthalaldehyde, nonanedial and acetalized products of the foregoing. In particular, formaldehyde, glyoxal, malondialdehyde and acetalized products of the foregoing and glutaraldehyde are preferred.

Examples of usable acids are strong acids, e.g. sulfuric acid, hydrochloric acid and nitric acid; weak acids, e.g. acetic acid, formic acid and phosphoric acid; acidic salts, e.g. ammonium hydrogensulfate. Among these, strong acids, particularly sulfuric acid, are preferred.

It is desirable that the degree of acetalization of PVA be in a range of 10 to 65 mole %, more preferably in a range of 30 to 60 mole %, in view of the water resistance and inhabitability for microorganisms of the resulting gel. The degree of acetalization can be controlled by adjusting the concentrations of the aldehyde and acid used, reaction time, reaction temperature and like conditions.

Where acetalization is conducted after coagulation, it is desirable that the concentrations of aldehyde and acid of the reaction solution be, with formaldehyde and sulfuric acid, at least 0.01 g/l and 0.5 to 300 g/l, respectively. Where acetalization is conducted simultaneously with the coagulation, it is desirable that the concentrations of aldehyde and acid of the reaction solution be 0.05 to 200 g/l and 1 to 100 g/l, respectively. On this occasion, where sodium sulfate is used as coagulating agent, its concentration is desirably in a range of 10 to 300 g/l with the temperature of the treating solution being 10 to 80° C., preferably.

Where the gel of the present invention is used as a carrier for bioreactor, it is desirable to subject the coagulated (or further acetalized) gel to water-washing and neutralization treatment. In particular, for use as a carrier for biocatalyst, sufficient washing is desirable because presence of an aldehyde deteriorates the inhabitability for microorganisms.

The hydrogels of the present invention, having a surface comprising a net-like structure, have a large surface area and hence have excellent water-retaining property, thereby being usable for a variety of uses. Representative uses are filter material (filter for removing suspended solid), water-retainer, coolant, replacement of biogels such as eye, skin and joint, material for controlled release of medicines, base material for actuator and packing material for chromatography.

In particular, the hydrogels of the present invention can be suitably used for bioreactors immobilizing biocatalysts such as enzymes and microorganisms, and also used as sewage purifiers and like items.

In permitting the hydrogels to carry biocatalysts such as microorganisms, the method of the carrying is not specifically limited. For instance, there may be employed an inclusive immobilization method which comprises incorporating microorganisms into the mixed solution beforehand. Where the gel is later subjected to a treatment that will badly influence the biocatalyst to be used, such as acetalization, it is desirable to add the biocatalyst after completion of gel production.

Any biocatalyst may be used for this purpose, and usable biocatalysts include bacteria, antinomycetes, mildew and yeast, cultured either purely or mixedly, and activated sludge.

Examples of usable microorganisms are those belonging to genuses of Muccor, Fusarium, Cladothrix, Sphaerotilus, Zooglea, Leptomitus, Aspergillus, Rhizopus, Pseudomonas, Escherichia, Saccharomyces and Candida. In addition, mentions are made of sulfur bacteria, methane bacteria, butyric acid bacteria, lactic acid bacteria, bacillus subtilis, myxomycetes, imperfect fungi, nitrate bacteria, nitrite bacteria and denitrifying bacteria.

When using the hydrogel of the invention for the purpose of sewage treatment, it is desirable to immobilize thereon bacteria that produce protease, glucosidase and lipase. More concretely, mentions are made of aerobic bacteria such as nitrifying bacteria and anaerobic bacteria such as denitrifying bacteria, sulfate reducing bacteria and methane bacteria. As the enzyme to be used, suitable selection may be made from those of any origin, that is, those originating from animals and those from microorganisms.

Although the hydrogels thus obtained have excellent effects, they may, as occasions demand, be used after at least part of water contained therein has been dried off, or they may be, after the drying, immersed in water again and then used. Removal of at least part of water leads to lightweight and easy transportation. Naturally, the gels can be used not only as they contain water but also in conditions other than water-containing condition.

The term "water-containing" herein is not limited to a condition containing water but includes conditions containing a mixture of water with other liquids and/or solid.

Other features of the invention will become apparent in the course of the following descriptions of exemplary embodiments which are given for illustration of the invention and are not intended to be limiting thereof.

In the Examples and Comparative Examples that follow, various properties were obtained according to the following methods.

Gel Structure

Electron photomicrographs of the surface and cut section of gel were taken. The diameters of the fiber-like articles in the surface layer and the thickness of the surface layer were observed.

Degree of Formalization

A PVA hydrogel sample was dried at 105° C. for 2 hours. A 0.2-g sample was precisely weighed out and placed in a distillation apparatus charged with a 25% sulfuric acid solution. The apparatus was heated while vapor was introduced thereinto. The formaldehyde that isolated was distilled together with water and absorbed in a 2% aqueous NaHSO3 solution. The quantity of free formaldehyde was determined by $I_2$ back-titrating of the excess NaHSO3. The degree of formalization was calculated from the molar ratio of the free formaldehyde to the hydroxyl group content of PVA gel.

Water Content

A hydrogel sample was immersed in water at 25° C. for 24 hours. After removal of water adhering on the surface, the sample was measured for the wet weight (W1). The sample was then dried at 105° C. for 4 hours and weighed for the dry weight (W2). The water content was calculated as follows.

Water content (%)=(W1−W2)/W1×100

Rate of Removing TOC (mg.TOC/l.gel.h)

The TOC removing rate is higher with a gel having better inhabitability for microorganisms.

A 500-g hydrogel sample was immersed in a sewage treating tank of Kuraray Okayama Plant for one month. Then, 100 g was taken and immersed in 1 liter of sewage having been adjusted to a TOC of 500 mg/l. The sewage was aerated and the rate of removing TOC per gel weight was determined.

Durability (%)

A hydrogel sample (500 g) was immersed in a sewage treating tank of Kuraray Okayama Plant. The weight retention after one year was tested.

EXAMPLE 1

A mixed aqueous solution containing 8% by weight of a PVA (average degree of polymerization: 1,700; degree of saponification: 99.8 mole %), 1% by weight of sodium alginate (DUCK ALGIN NSPL, made by Kibun Food Chemifa Co.) and 0.3% by weight of sodium hydrogencarbonate was prepared. The aqueous mixed solution had caused a suspension-like phase separation and was white turbid. The phase-separated liquid was fed at a rate of 5 ml/min by a roller pump fitted with a silicon tube having an inner diameter of 4 mm and equipped on the end thereof with a nozzle having an inner diameter of 3 mm, and added dropwise onto a 0.1 mole/l aqueous calcium chloride solution being stirred with a stirrer. The liquid drops added were, with the sodium alginate present at least on their surfaces being solidified in the aqueous calcium chloride solution, precipitated. The obtained solids were spherical.

The spherical solids were immersed in an aqueous solution containing 20 g/l of formaldehyde, 200 g/l of sulfuric acid and 100 g/l of sodium sulfate, at 40° C. for 60 minutes, to undergo coagulation into gel granules simultaneously with acetalization. The acetalized gel granules obtained were washed with water, to yield spherical hydrogel granules having good flexibility and having a diameter of about 5 mm.

Observation of the structure of the obtained gel revealed that the surface layer had a net-like structure formed by entanglement of fiber-like articles having a diameter of about 0.3 to 10 μm and that the surface layer had a thickness of about 5% of the maximum diameter of the gel.

It was also found that there had been formed inside the gel a dense inner layer having a thickness of about 75% of the gel maximum diameter and having micropores with a diameter ranging from about 1 to 10 μm.

It was further found that between the surface layer and inner layer there had been formed an intermediate layer formed by a multiplicity of finger-like voids orienting from the surface layer toward the inner layer and having a pore diameter of about 100 μm. The intermediate layer had a thickness of about 20% of the gel maximum diameter.

The gel obtained in Example 1, having a surface layer comprising a net-like structure formed from fine fiber-like articles, permits microorganisms to adhere thereto readily and produces excellent capability for treating sewage, thanks to its large surface area.

The gel, with its inside comprising a dense inner layer having fine pores, exhibits high gel strength, and permits anaerobic bacteria and the like to readily live therein, thereby exhibiting excellent purifying function.

Furthermore, the gel obtained in Example 1, having an intermediate layer formed by a multiplicity of finger-like voids orienting from the surface layer toward the inner layer, permits microorganisms to invade into and live in the inside readily. This structure also permits sewage water to permeate through the gel readily, thereby exhibiting still better purifying property.

The results are shown in Table 1.

EXAMPLE 2

A mixed aqueous solution containing 5% by weight of a PVA (average degree of polymerization: 4,000; degree of saponification: 99.8 mole %), 1% by weight of sodium alginate (DUCK ALGIN NSPL, made by Kibun Food Chemifa Co.) and 0.25% by weight of sodium sulfate was prepared. The mixed aqueous solution had caused a suspension-like phase separation and was white turbid. Thereafter, with this solution, the procedure of Example 1 was followed, to produce spherical hydrogel granules having good flexibility and having a diameter of about 5 mm.

Observation of the structure of the obtained gel revealed that the surface layer had a net-like structure formed by entanglement of fiber-like articles having a diameter of about 0.3 to 10 μm and that the surface layer had a thickness of about 5% of the maximum diameter of the gel.

It was also found that there had been formed inside the gel a dense inner layer having a thickness of about 80% of the gel maximum diameter and having micropores with a diameter ranging from about 2 to 20 μm.

It was further found that between the surface layer and inner layer there had been formed an intermediate layer formed by a multiplicity of finger-like voids orienting from the surface layer toward the inner layer and having a pore diameter of about 50 μm. The intermediate layer had a thickness of about 15% of the gel maximum diameter.

The gel obtained in Example 2 had, similar to that in Example 1, excellent properties. The results are shown in Table 1.

EXAMPLE 3

Example 1 was repeated except that the phase-separated liquid was extruded into the aqueous calcium chloride solution, to obtain a fiber-shaped hydrogel. The fiber-shaped gel obtained was cut to yield cylindrical hydrogel chips having a diameter of 5 mm and a length of 5 mm.

Observation of the structure of the obtained gel revealed that the surface other than the cut surfaces had a net-like structure formed by entanglement of fiber-like articles having a diameter of about 0.3 to 10 μm and that the surface layer had a thickness of about 5% of the maximum diameter of the gel.

It was also found from observation of the cut surface that there had been formed inside the gel a dense inner layer having a thickness of about 80% of the gel maximum diameter and having micropores with a diameter ranging from about 1 to 10 μm.

It was further found that between the surface layer and inner layer there had been formed an intermediate layer formed by a multiplicity of finger-like pores orienting from the surface layer toward the inner layer and having a pore diameter of about 80 μm. The intermediate layer had a thickness of about 15% of the gel maximum diameter.

COMPARATIVE EXAMPLE 1

Example 1 was repeated except that a mixed aqueous solution containing 8% by weight of a PVA (average degree of polymerization: 1,700; degree of saponification: 99.8 mole %) and 1% by weight of sodium alginate was used instead of the phase-separated liquid, to produce hydrogel granules having a diameter of about 5 mm.

The gel thus obtained, which had been prepared with no use of a phase-separated liquid, had a smooth surface on which no surface layer comprising fiber-like articles had been formed (see FIG. 4). As a result, the gel had poor capability for adhering microorganisms and, with its reduced surface area, had insufficient purifying property.

The results are shown in Table 1.

COMPARATIVE EXAMPLE 2

There was used a mixed aqueous solution containing 8% by weight of a PVA (average degree of polymerization: 1,700; degree of saponification: 99.8 mole %) and 1% by weight of sodium alginate instead of the phase-separated liquid used in Example 1. The solution was added dropwise in the same manner as in Example 1 to the same aqueous calcium chloride solution. The liquid drops added were, with the sodium alginate present at least on their surfaces being solidified in the aqueous calcium chloride solution, precipitated. The obtained solids were spherical.

The spherical granules were separated from the aqueous calcium chloride solution, washed with water and placed in a tray. The granules were freezed in a refrigerator at −20° C. for 24 hours and then thawed at room temperature, to yield spherical hydrogel granules having a diameter of about 5 mm. The gel thus obtained had a roughened surface on which crater-like projections and recesses had formed (see FIG. 5). Although the gel had a high capability of adhering microorganisms, it had poor purifying property due to its dense structure which barred microorganisms from invading into its inside.

The results are shown in Table 1.

COMPARATIVE EXAMPLE 3

A mixed aqueous solution containing 8% by weight of a PVA (average degree of polymerization: 1,700; degree of saponification: 99.8 mole %) and 5% by weight of sodium alginate (DUCK ALGIN NSPL, made by Kibun Food Chemifa Co.) was prepared. The mixed aqueous solution was, through a nozzle having an inner diameter of 0.8 mm) added dropwise to a 0.5 mole/l calcium chloride solution. In this aqueous calcium chloride solution, there had been dispersed beforehand PVA short fibers (made by Kuraray Co) having a length of 6 mm and a size of 2 deniers. The mixed aqueous solution dropped was solidified into spheres and, at the same time, the PVA fibers adhered moustache-like on the surface of the solidified matter in an amount of 1.3% by weight.

The solidified matter was, after being washed with water sufficiently, subjected to three repeated cycles of freezing at −20° C. for 20 hours and thawing at room temperature over 12 hours, to yield a PVA hydrogel to which PVA fibers had adhered in a moustache-like manner. The amount of the fibers having adhered to the gel was 2% by weight based on the weight of the hydrogel. The length of the fibers projecting from the surface of the gel was 2 to 5 mm. Although the gel had adhered on the surface thereof rigid fiber-like articles, which were not fine ones like with the present invention, the gel had only poor capability of adhering microorganisms.

Furthermore, when these gel granules contact with each other, their coarse fibers contact with each other to create a large frictional force. As a result, the gel granules have poor flowability and, due to damage resulting from such contact, insufficient durability.

The results are shown in Table 1.

Obviously, numerous modifications and variations of the invention are possible in light of the above teachings. It is therefore to be understood that within the scope of the appended claims, the invention may be practices otherwise than as specifically described herein.

TABLE 1

|  |  | Shape of gel | Surface structure | Degree of formalization | Water content | TOC removing rate | Durability |
|---|---|---|---|---|---|---|---|
| Example | 1 | Spherical | Net-like | 39 | 91.1 | 1550 | 99.7 |
|  | 2 | Spherical | Net-like | 37 | 90.8 | 1510 | 99.6 |
|  | 3 | Cylindrical | Net-like | 35 | 91.0 | 1500 | 98.6 |

TABLE 1-continued

|  |  | Shape of gel | Surface structure | Degree of formalization | Water content | TOC removing rate | Durability |
|---|---|---|---|---|---|---|---|
| Comparative Example | 1 | Spherical | Smooth | 40 | 90.7 | 650 | 96.1 |
|  | 2 | Spherical | Crater-like | 0 | 89.4 | 520 | 41.6 |
|  | 3 | Spherical | With coarse fibers | 0 | 87.5 | 470 | 38.5 |

What is claimed is:

1. A polyvinyl alcohol hydrogel having a surface layer comprising a net-like structure formed by entanglement of fiber-like articles having a diameter of 0.1 to 50 $\mu$m, and obtained by one of the following process (1)–(4);

(1) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid; and contacting the obtained solid with a coagulating liquid having coagulating function for said polymer A, to effect gelation; or (2) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and removing from the obtained gel said polymer B partially or entirely; or (3) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and effecting acetalization simultaneously with or after the above gelation; or (4) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation, effecting acetalization simultaneously with or after the above gelation; and removing from the gel obtained in the above step said polymer B partially or entirely.

2. The polyvinyl alcohol hydrogel according to claim 1, further having a spherical shape having a diameter of 1 to 10 mm.

3. The polyvinyl alcohol hydrogel according to either claim 1 or claim 2, further being acetalized.

4. A shaped polyvinyl alcohol article obtained by removing at least part of water contained in the polyvinyl alcohol hydrogel according to claim 1.

5. A gel having the feature of forming by alkali treatment a polyvinyl alcohol hydrogel having a surface layer comprising a net-like structure, said net-like structure being formed by entanglement of fiber-like articles having a diameter of 0.1 to 50 $\mu$m, wherein said polyvinyl alcohol hydrogel is obtained by one of the following processes (1)–(4);

(1) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid; and contacting the obtained solid with a coagulating liquid having coagulating function for said polymer A, to effect gelation; or (2) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and removing from the obtained gel said polymer B partially or entirely; or (3) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and effecting acetalization simultaneously with or after the above gelation; or (4) adding to a mixed polymer solution containing a vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation;

effecting acetalization simultaneously with or after the above gelation; and removing from the gel obtained in the above step said polymer B partially or entirely.

6. A process for producing polyvinyl alcohol hydrogels, which comprises the steps of:

adding to a mixed polymer solution containing vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid; and contacting the obtained solid with a coagulating liquid having coagulating function for said polymer A, to effect gelation, wherein said polyvinyl alcohol hydrogels have a surface layer comprising a net-like structure formed by entanglement of fiber-like articles having a diameter of 0.1 to 50 $\mu$m.

7. A process for producing polyvinyl alcohol hydrogels, which comprises the steps of:

adding to a mixed polymer solution containing vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and removing from the obtained gel said polymer B partially or entirely, wherein said polyvinyl alcohol hydrogels have a surface layer comprising a net-like structure formed by entanglement of fiber-like articles having a diameter of 0.1 to 50 $\mu$m.

8. A process for producing polyvinyl alcohol hydrogels, which comprises the steps of:

adding to a mixed polymer solution containing vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation; and effecting acetalization simultaneously with or after the above gelation, wherein said polyvinyl alcohol hydrogels have a surface layer comprising a net-like structure formed by entanglement of fiber-like articles having a diameter of 0.1 to 50 µm.

9. A process for producing polyvinyl alcohol hydrogels, which comprises the steps of:

adding to a mixed polymer solution containing vinyl alcohol polymer (polymer A) and a polymer (polymer B) that gels on contact with a cation, a substance (substance C) capable of causing phase separation of said polymer solution, to prepare a phase-separated liquid, contacting said phase-separated liquid with a cation-containing liquid, to solidify the polymer B present at least on the surface of said phase-separated liquid;

contacting the obtained solid with a coagulating liquid having coagulating function for said polymer A, to effect gelation;

effecting acetalization simultaneously with or after the above gelation; and removing from the gel obtained in the above step said polymer B partially or entirely, wherein said polyvinyl alcohol hydrogels have a surface layer comprising a net-like structure formed by entanglement of fiber-like articles having a diameter of 0.1 to 50 µm.

10. The process according to any one of claim 6 through claim 9, wherein said polymer B is sodium alginate.

11. A shaped polyvinyl alcohol article obtained by removing at least part of water contained in the polyvinyl alcohol hydrogel according to claim 2.

12. A shaped polyvinyl alcohol article obtained by removing at least part of water contained in the polyvinyl alcohol hydrogel according to claim 3.

* * * * *